United States Patent [19]

Yoshihara

[11] Patent Number: 5,719,205
[45] Date of Patent: Feb. 17, 1998

[54] COATING COMPOSITION, PROCESS FOR PRODUCING THE SAME, METHOD FOR FORMING COATING, AND COATING

[75] Inventor: Toshio Yoshihara, Tokyo, Japan

[73] Assignee: Dai Nippon Printing Co., Ltd., Japan

[21] Appl. No.: 372,665

[22] Filed: Jan. 13, 1995

[30] Foreign Application Priority Data

Jan. 18, 1994 [JP] Japan .................. 6-018968
Nov. 30, 1994 [JP] Japan .................. 6-321314

[51] Int. Cl.$^6$ ..................... C08K 9/00
[52] U.S. Cl. .......... 523/209; 523/200; 523/202; 523/204; 523/211; 523/213; 523/216; 524/113; 524/368; 524/533; 524/556; 524/558; 525/274; 525/326.1; 525/330.2; 525/330.6
[58] Field of Search .................. 523/202, 200, 523/209 OR, 211, 204, 216; 524/533, 113, 368, 556, 558; 525/274, 326.1, 330.2, 330.6

[56] References Cited

U.S. PATENT DOCUMENTS

| | | | |
|---|---|---|---|
| 3,177,170 | 4/1965 | Lund | 523/213 X |
| 4,433,073 | 2/1984 | Sano et al. | 523/201 |
| 4,624,971 | 11/1986 | van Tao et al. | 523/209 X |
| 4,626,567 | 12/1986 | Chang | 523/213 |
| 4,849,140 | 7/1989 | Wellinghoff et al. | 264/9 |
| 4,939,189 | 7/1990 | Tobinaga et al. | 523/209 X |
| 4,948,739 | 8/1990 | Charmot | 523/211 X |
| 4,977,192 | 12/1990 | Martineau et al. | 523/209 X |
| 5,013,770 | 5/1991 | Carpenter et al. | 523/213 |
| 5,244,950 | 9/1993 | Schlarb et al. | 524/533 X |
| 5,332,766 | 7/1994 | Takaya et al. | 523/201 |
| 5,332,767 | 7/1994 | Reisser et al. | 523/201 X |
| 5,385,988 | 1/1995 | Yamamoto et al. | 523/209 X |

FOREIGN PATENT DOCUMENTS 0255079  2/1988  European Pat. Off. ......... 523/213

*Primary Examiner*—Judy M. Reddick
*Attorney, Agent, or Firm*—Parkhurst & Wendel

[57] ABSTRACT

Synthetic resin particles having a hydrogen bond forming group are swollen, at least one metallic compound capable of forming a hydrogen bond is introduced into the synthetic resin particles, and the metallic compound is hydrolyzed and condensed within the synthetic resin particles and on and in the vicinity of the surface of the synthetic resin particles. An inorganic component is grown by this reaction, and at least part of the grown inorganic component 3 is fixed through a reaction with a hydrogen bond forming group present within the synthetic resin particles 1 and on and in the vicinity of the surface of the synthetic resin particles 1 to prepare a coating composition. The coating composition is coated on the surface of a substrate, and the resulting coating is dried at a temperature of the lowest film forming temperature or above to form a coating.

28 Claims, 5 Drawing Sheets

COATING COMPOSITION, PROCESS FOR PRODUCING THE SAME, METHOD FOR FORMING COATING, AND COATING

BACKGROUND OF THE INVENTION

The present invention relates to a coating composition useful for an antireflection film provided on the surface of various displays of word processors, computers, and televisions, optical lenses, such as sunglass lenses of transparent plastics, lenses of eyeglass, finder lenses for cameras, covers for various instruments, and surface of window glasses of automobiles and electric railcars. Further, the present invention relates to a coating composition useful for a coating for a construction material such as concrete.

Various displays of word processors, computers, televisions, and the like are designed so that visual information, such as letters and figures, is observed through glass or a transparent substrate provided on the surface thereof. When light externally enters the display and reflects from the surface thereof, the visibility of the display is deteriorated. For this reason, an antireflection film has hitherto been formed on the surface of the display.

Conventional methods for preventing the reflection of light, which enters the surface of the transparent substrate, include, for example, a method wherein an antireflection coating containing inorganic ultrafine particles as an antireflection material is coated on the surface of glass or plastics, a method wherein a thin film of $MgF_2$ or the like having a thickness of about 0.1 μm or a metal deposited film is provided directly on the surface of a transparent substrate, such as glass, a method wherein an ionizing radiation curing resin is coated on the surface of plastics, such as plastic lenses, and a thin film of $SiO_2$ or $MgF_2$ is formed thereon by vapor deposition, and a method wherein a coating having a low refractive index is formed on a cured film of an ionizing radiation curing resin.

The thin film of $MgF_2$, having a thickness of about 0.1 μm, formed on the glass will now be described in more detail. It is already known that, when light perpendicularly enters a thin film, in order for the antireflection film to prevent the reflection of light by 100% and to pass light by 100% therethrough, the relationships represented by the equations (1) and (2) should be met (see "Science Library" Physics=9 "Optics," pp. 70–72, 1980, Science Sha Ltd., Japan).

$$n_0 = \sqrt{n_g} \qquad \text{equation (1)}$$

$$n_f d = \lambda/4 \qquad \text{equation (2)}$$

wherein $\lambda_0$ represents a particular wavelength, $n_0$ represents the refractive index of the antireflection film at this wavelength, g represents the thickness of the antireflection film, and $n_g$ represents the refractive index of the substrate.

According to the equation (1), a material to be selected is such that the refractive index of the antireflection layer is equal to a value of the square root of the refractive index of the underlying layer. For this reason, in the prior art, the refractive index of the antireflection layer is formed so as to have a somewhat lower refractive index than the refractive index of the underlying layer.

On the other hand, in the field of paints for buildings, inorganic paints are strongly desired from the viewpoint of heat resistance and flame resistance. Since, however, a coating using an inorganic polymer is harder and more fragile than that using an organic polymer, an organic polymer is incorporated in an inorganic polymer for the purpose of alleviating the above drawback.

For the above conventional method wherein an antireflection film is formed by the vapor deposition process, the productivity is generally so low that the profitability is low. In addition, when the substrate is made of a plastic film, the adhesion between a film formed thereon by vapor deposition and the substrate is so low that peeling is likely to occur. Further, in this case, since the substrate is covered with the surface of an inorganic material, the properties of the substrate cannot be reproduced, for example, because subsequent dyeing cannot be carried out. This method suffers from further problems, such as occurrence of damage to the surface of the substrate during vapor deposition and occurrence of damage to the film due to evaporation of a plasticizer, an ultraviolet absorber, and the like contained in the plastic film by the vacuum process.

For the conventional method wherein an antireflection coating is applied, in order to keep the refractive index of the antireflection layer low, it is necessary to form an ultrafine particle dispersion comprising a binder resin and, dispersed therein in as large an amount as possible, inorganic ultrafine particles having a low refractive index. The inorganic ultrafine particles, however, mutually aggregate in the binder resin and, hence, cannot be successfully dispersed, making it substantially impossible to incorporate the inorganic ultrafine particles in a large amount or homogeneously mix the inorganic ultrafine particles with the binder resin. Further, the use of the inorganic ultrafine material in a large amount unfavorably results in deteriorated film forming property and lowered mechanical strength. For this reason, it becomes difficult to form a layer having a desired refractive index, which finally makes it difficult to form an antireflection film.

In order to solve the above problem, the present inventor has already proposed in a patent application (Japanese Patent Application No. 146815/1993) an antireflection film having a desired refractive index, which antireflection film is produced by using an inorganic ultrafine particle material and introducing into a binder resin a functional group capable of forming a hydrogen bond with the inorganic ultrafine particles directly or through a third substrate to disperse in a high concentration the inorganic ultrafine particles in a solvent for the binder resin, and forming an optical material from the high-concentration dispersion.

In the above invention, when an internally crosslinked particulate resin, such as microgel, is used as the binder resin, if inorganic ultrafine particles are excessively present at the time of drying a coating, the inorganic ultrafine particles gather at the interface of the binder resins. This unfavorably serves to inhibit fusing between the binder resin particles and curing of the binder resin and, hence, renders the airtightness of the coating unsatisfactory, making it difficult to impart satisfactory strength to the antireflection layer.

When a plastic is used as the substrate and a coating, such as an antireflection film, is formed thereon, since the surface of the plastic substrate per se is very soft, the substrate suffers from problems, such as lack in scratch resistance. For this reason, it is very difficult to simultaneously impart an antireflection capability and a hard property to the coating. In particular, when an antireflection film is formed on a film, the coating is required to have flexibility in addition to the hard property.

The paint for buildings, which comprises an inorganic polymer and, incorporated therein, an organic polymer, has a problem that the heat resistance and flame resistance characteristic of the inorganic polymer are significantly deteriorated.

Under these circumstances, the present invention has been made, and an object of the present invention is to render a binder resin and an inorganic component homogeneous on a molecular level and to provide a coating composition, which enables an inorganic component to be dispersed in a large proportion in a binder resin and can provide a coating having sufficient strength and capable of exhibiting satisfactory antireflection effect depending upon the inorganic component used, a process for producing the same, a method for forming a coating, and the coating.

Another object of the present invention is to provide a coating composition, which can impart to a coating a hard property, flexibility, heat resistance, and flame resistance, a process for producing the same, a method for producing a coating, and the coating.

A further object of the present invention is to provide a paint for buildings having improved heat resistance and flame resistance.

SUMMARY OF THE INVENTION

In order to solve the above problems, the present inventors have made studies on quantitative combining of an inorganic component with an organic polymer in the course of the preparation of a coating composition and, in particular, blended a synthetic resin emulsion with an organometal compound exemplified by a metal alkoxide and formed a coating from the blend, which has led to the completion of the following invention.

According to one aspect of the present invention, there is provided a coating composition composed mainly of: a coating forming synthetic resin emulsion comprising particles of a synthetic resin having a hydrogen bond forming group; and at least one metallic compound which can form a hydrogen bond.

According to another aspect of the present invention, there is provided a process for producing a coating composition, comprising the steps of: swelling particles of a synthetic resin having a hydrogen bond forming group; and introducing at least one metallic compound capable of forming a hydrogen bond into said synthetic resin particles.

According to a further aspect of the present invention, there is provided a process for producing a coating composition, comprising the steps of: swelling particles of a synthetic resin having a hydrogen bond forming group; introducing at least one metallic compound capable of forming a hydrogen bond into said synthetic resin particles; and hydrolyzing and condensing said metallic compound within said synthetic resin particles to grow said inorganic component, at least part of the grown inorganic component being reacted with said hydrogen bond forming group present within said synthetic resin particles, thereby fixing the grown inorganic component into said synthetic resin particles.

According to a further aspect of the present invention, there is provided a process for producing a coating composition, comprising the steps of: swelling particles of a synthetic resin having a hydrogen bond forming group; and introducing at least one metallic compound capable of forming a hydrogen bond into said synthetic resin particles and permitting said metallic compound to gather also on and in the vicinity of the surface of said synthetic resin particles.

According to a further aspect of the present invention, there is provided a process for producing a coating composition, comprising the steps of: swelling particles of a synthetic resin having a hydrogen bond forming group; introducing at least one metallic compound capable of forming a hydrogen bond into said synthetic resin particles and permitting said metallic compound to gather also on and in the vicinity of the surface of said synthetic resin particles; and hydrolyzing and condensing said metallic compound within said synthetic resin particles and on and in the vicinity of the surface of said synthetic resin particles to grow said inorganic component, at least part of the grown inorganic component being reacted with said hydrogen bond forming group present within said synthetic resin particles and on and in the vicinity of the surface of said synthetic resin particles, thereby fixing the grown inorganic component within said synthetic resin particles and on and in the vicinity of the surface of said synthetic resin particles.

According to a further aspect of the present invention, there is provided a method for forming a coating, comprising the steps of: coating the above coating composition on the surface of a substrate; and allowing the resultant coating to stand for drying or drying the resultant coating at a temperature of 200° C. or below to grow an inorganic component present within said synthetic resin particles of said coating composition, thereby forming a coating with said inorganic component fixed through at least a hydrogen bond and/or a covalent bond.

According to a further aspect of the present invention, there is provided a method for forming a coating, comprising the steps of: coating the above coating composition on the surface of a substrate; and allowing the resultant coating to stand for drying or drying the resultant coating at a temperature of 200° C. or below to grow part of an inorganic component present within said synthetic resin particles and on and in the vicinity of the surface of said synthetic resin particles of the coating composition, thereby forming a coating with said inorganic component being fixed through at least a hydrogen bond and/or a covalent bond and, at the same time, the major part of the inorganic component remaining unintroduced into said synthetic resin particles being raised on the outermost layer of said coating in the course of the formation of said coating to constitute a continuous layer of said inorganic component.

According to a further aspect of the present invention, there is provided a coating comprising synthetic resin particles mutually bonded to one another and an inorganic component, at least part of said inorganic component being present within said synthetic resin particles in such a state that it is bonded to a resin component of said synthetic resin particles through a hydrogen bond and/or a covalent bond.

According to a further aspect of the present invention, there is provided a coating comprising a continuous layer of an inorganic component and, covered therewith, synthetic resin particles mutually bonded to one another, at least part of said inorganic component being present within said synthetic resin particles and on and in the vicinity of the surface of said synthetic resin particles in such a state that it is bonded to a resin component of said synthetic resin particles through a hydrogen bond and/or a covalent bond.

Since the present invention has the above constitution, in the coating composition of the present invention, an organic component and an inorganic component have an affinity for each other despite the fact that the organic component and the inorganic component are contained in large amounts. In the formation of a coating using the coating composition, the inorganic component is grown and, at the same time, combined with the organic component, so that the inorganic component is introduced into the synthetic resin particles and, at the same time, forms a continuous layer as the outermost layer of the coating so as to cover the organic component. Consequently, the formed coating has sufficient strength and, further, satisfactory antireflection effect depending upon the inorganic component used, and a hard property, flexibility, heat resistance, and flame retardance. Accordingly, the coating composition of the present invention can be used for optical material applications or building applications.

BEST MODE FOR CARRYING OUT THE INVENTION

The present invention will now be described in more detail.

Synthetic Resin Particles

The synthetic resin particles having a hydrogen bond forming group used in the present invention are not particularly limited. However, synthetic resin particles having a hydrogen bond forming group and called "polymer latex fine particles" are preferably used. In particular, when the coating composition of the present invention is used as an antireflection layer, synthetic resin particles of a homopolymer or a copolymer of an α,β-ethylenic unsaturated monomer having a functional group, exemplified by an acrylic derivative or a methacrylic derivative, are particularly preferred by virtue of high transparency.

Examples of the α,β-ethylenic unsaturated monomer having a functional group include unsaturated carboxylic acids or unsaturated polycarboxylic acid derivatives, such as acrylic acid, mathacrylic acid, crotonic acid, maleic acid, fumaric acid, iraconic acid, maleic anhydride, a monoester of maleic acid, and a monoester of fumaric acid, unsaturated carboxylic acid amides, such as acrylamide and methacrylamide, N-methylol unsaturated carboxylic acid amides, such as N-methylol acrylamide and N-methylol methacrylamide, unsaturated glycidyl compounds, such as glycidyl acrylate and glycidyl methacrylate, unsaturated compounds with an alkylol group being introduced therein, such as hydroxyethyl acrylate, hydroxypropyl methacrylate, and hydroxyvinyl ether, diallyl phthalate, divinylbenzene, and diallyl compounds. They may be used alone or in combination of two or more.

Examples of other monomers for constituting the synthetic resin particles usable in the present invention include acrylic esters, such as methyl acrylate, ethyl acrylate, butyl acrylate, 2-ethylhexyl acrylate, and lauryl acrylate, methacrylic esters, such as methyl methacrylate, ethyl methacrylate, butyl methacrylate, isobutyl methacrylate, 2-ethylhexyl methacrylate, and lauryl methacrylate, acrylonitrile, methacrylonitrile, styrene, and chlorostyrene. Among them, a combination of a monomer having a higher glass transition temperature with a monomer having a lower glass transition temperature is particularly preferred from the viewpoint of preventing cracking caused by evaporation of a solvent at the time of drying of the coating.

In particular, when the coating composition is for an optical material, a methacrylic ester monomer among the above monomers is mainly used from the viewpoint of excellent transparency. Further, a styrene-acrylic monomer having a high styrene content is favorable because it lowers the film forming temperature and improves the workability.

Monomers which may be optionally copolymerized with the above monomers include, besides acrylic esters or methacrylic esters, unsaturated carboxylic esters or unsaturated polycarboxylic esters, such as methyl crotonate, ethyl crotonate, dibutyl maleate, and diethyl fumarate, vinyl esters, such as a vinyl ester of a saturated carboxylic acid branched at the m-position, such as vinyl acetate, vinyl 2-propionate, vinyl laurate, vinyl stearate, and vinyl pivalate, vinyl chloride, vinylidene chloride, and ethylene. They may be used alone or in combination of two or more.

The above polymer latex fine particles as the synthetic resin particles having a hydrogen bond forming group can be prepared by a conventional emulsion polymerization method or a soap-free emulsion polymerization method (a method for synthesizing a polymer emulsion without using any emulsifier), a seed emulsion polymerization method (a method for mainly polymerizing a hydrophobic monomer using, as a seed for polymerization, the interior of the above synthesized polymer emulsion). The interior of such polymer latex fine particle has a three-dimensional structure formed by a suitable degree of crosslinking, and regulation of the crosslinking can impart desired properties to the coating and improve the solvent resistance.

The interior of the above polymer latex fine particle can be crosslinked, for example, as described in a synthesis example of "Toso Kogaku," Vol. 22, No. 9, p. 384 (1987). For example, polymer latex fine particles, of which the interior is crosslinked to a suitable extent, can be prepared by crosslinking a copolymer of methyl methacrylate with ethyl acrylate in the presence of a highly crosslinkable oligoester acrylate reactive emulsifier, adding the remaining mixed monomer, and carrying out copolymerization while dropwise adding a potassium persulfate/sodium thiosulfate initiator.

In the present invention, the above synthetic resin particles should contain a hydrogen bond forming group, which can combine with the following metallic compound capable of forming a hydrogen bond, such as a hydroxyl group, a carboxyl group, or an amino group, to form a hydrogen bond. The above hydrogen bond forming group can be easily introduced by adding a monomer having a functional group, such as an acrylic acid derivative or a methacrylic acid derivative, in an amount of 1 to 5% by weight based on the total amount of the monomers, in the course of polymerization of the above synthesis example of synthetic resin particles. The introduction of a hydrogen bond forming group by this method is preferred because a large amount of a hydrogen bond forming group can be introduced into the interior of the synthetic resin particles.

The particle diameter of the synthetic resin particles in the coating according to the present invention, particularly when the formation of a transparent coating is contemplated, determines the optical properties of the coating. A proper particle diameter is selected preferably in a range of 10 μm or less. The particle diameter is particularly preferably less than the wavelength of light 0.05–0.06 μm which is in a visible light region and to which human being is highly sensitive, because it does not adversely affect the light transmission from the viewpoint of the visual acuity of the human being and also because, when an inorganic component is grown within the synthetic resin particles, the inorganic component is not grown to an excessive size.

When uniform coating is contemplated, it is preferred for the synthetic resin particles to have a uniform particle diameter. If at least two types of synthetic resin particles having remarkably different particle diameters are used, the coated surface becomes so uneven that the transparency is often unsatisfactory.

When the interior of the synthetic resin particles is crosslinked to a suitable extent, the inorganic component fixed within the synthetic resin particles is considered to increase the crosslinking density. However, when the crosslinking density is excessively increased, there occurs a lowering in mechanical strength of the coating per se or a deterioration in transparency. For this reason, the crosslinking density of the synthetic resin particles and the amount of the metallic alkoxide added should be properly regulated.

Metallic Compound Capable of Forming Hydrogen Bond

"Metallic compounds capable of forming a hydrogen bond" used in the present invention include, known as precursor of inorganic glass or ceramics by the sol-gel process, organometallic compounds, such as metal alkoxide derivatives, metal acetylacetonate derivatives, and metal carboxylate derivatives; a hydrolysate, a partial hydrolysate, and a partial condensate of the organometallic compounds; inorganic metal compounds, such as a nitrate, an oxynitrate, and a chloride of metals corresponding to the organometallic compounds; and a hydrolysate, a partial hydrolysate, and a partial condensate of said inorganic metallic compounds.

The sol-gel process which utilizes hydrolysis and condensation of an organometallic compound exemplified by an metal alkoxide involves a reaction for synthesizing a metal oxide at a low temperature and can be particularly suitably utilized in the growth of an inorganic component within the synthetic resin particles and on and in the vicinity of the surface of the synthetic resin particles in the present invention. The reason for this is as follows. The hydrolyzate, partial hydrolyzate, and partial condensate of a metal alkoxide in the course of a growth reaction of the inorganic component contains a particularly large amount of a hydroxyl group having a hydrogen bond forming capability which combines with synthetic resin particles having a hydrogen bond forming group to form a hydrogen bond or an ester bond, facilitating the fixation of the grown inorganic component through a hydrogen bond, an ester bond, or the like to within the synthetic particles and on and in the vicinity of the surface of the synthetic resin particles and, therefore, are favorable for realizing the present invention.

Almost all of the metal alkoxides may be utilized as the metal alkoxide in the present invention. Among them, alkoxides, such as silica, titanium, aluminum, zinc, zirconium, antimony, and tin, are preferred because they are relatively inexpensive and the reaction thereof can be relatively easily regulated.

The presence of two or more alkoxy groups per molecule of the metal alkoxide is necessary for the growth of the inorganic component and the hydrogen bonding within the synthetic resin particles. If this requirement is met, the presence of a hydrocarbon group, such as an alkyl group, or a reactive functional group, such as an epoxy group or an amide group, has no adverse effect. These functional groups other than the alkoxy group have a favorable effect on imparting of flexibility to the coating, reinforcement to the coating, improvement in dyeability, and the like and may be present for such various purposes.

The amount of the metallic compound incorporated in the coating composition of the present invention is preferably 0.01 to 30 parts by weight based on one part by weight of the synthetic resin particles. When the amount of the metallic compound incorporated is less than 0.01 part by weight based on one part by weight of the synthetic resin particles, no effect can be attained by the addition of the inorganic component. On the other hand, when it exceeds 30 parts by weight, the inorganic component occupies the most of the whole coating formed, so that the coating unfavorably becomes hard or fragile. Further, when the amount of the metallic compound incorporated is not less than 16 parts by weight based on one part by weight of the synthetic resin particles, the resultant coating is transparent and has improved surface hardness and heat resistance.

Swelling of Synthetic Resin Particles

In the production of the coating composition of the present invention, the synthetic resin particles should be in a swollen state for the purpose of introducing a metallic compound into the synthetic resin particles. The synthetic resin particles are swollen by a method wherein an organic solvent is used, a method wherein synthetic resin particles are heated, or a method wherein the above methods are used in combination.

In the method wherein an organic solvent is used, a coating forming emulsion comprising synthetic resin particles and water is added to an organic solvent, such as ethanol or tetrahydrofuran, to swell the synthetic resin particles. Such swollen synthetic resin particles can receive a metallic compound which is condensed within the synthetic resin particles to grow an inorganic component, facilitating the fixation of the inorganic component.

The metal alkoxide is insoluble in water and soluble in an organic solvent and, hence, can be particularly homogeneously reacted in the above system where a solvent is used. In this case, the organic solvent or the like is usually employed in an amount of 0.5 to 8 times by mole the amount of the metal alkoxide. When the amount of the organic solvent used is less than 0.5 time by mole, swelling is unsatisfactory, so that the effect of the present invention cannot be sufficiently developed. On the other hand, when it exceeds 8 times by mole, the effect attained by the addition of the organic solvent is not increased for the amount of the organic solvent added and the results are only that the amount of the solution is unfavorably increased.

In general, heating at a temperature above the glass transition temperature of the resin component constituting the synthetic resin particles is necessary for swelling the synthetic resin particles. By contrast, in the production of the coating composition of the present invention, the whole procedure can be carried out in a solution system independently of the components, enabling the synthetic resin particles to be sufficiently swollen by heating at room temperature or above, preferably 50° C. or above. In the production of the coating composition of the present invention, the addition of synthetic resin particles to an organic solvent followed by reaction with heating is still preferred because sufficiently swollen synthetic resin particles can be provided.

Hydrolysis of Metallic Compound

The hydrolysis of a metallic compound capable of forming a hydrogen bond occurs by water as a dispersing medium for a polymer latex. The amount of water used is preferably about 1 to 10 moles based on one mole of the metallic compound and should be regulated according to need. When the amount of water used is less than 1 mole, the hydrolysis does not proceed sufficiently, often making it impossible to attain the effect of the present invention. On the other hand, when the amount of water used exceeds 10 moles, there is a fear of the transparency of the resultant coating being deteriorated. In order to accelerate the hydrolysis, it is also possible to add an acid or an alkali catalyst in such an amount as will not be detrimental to the synthetic resin particles.

When the hydrolysis of the metallic compound is carried out in a system consisting of water alone, the reaction temperature is preferably in the range of from room temperature to 80° C., particularly preferably in the range of from 50° to 80° C. When the hydrolysis is carried out at a temperature below room temperature, there is a possibility that no inorganic component involved in optical properties of the coating can be provided. On the other hand, when the hydrolysis is carried out at a temperature above 80° C., the metallic compound rapidly gels, unfavorably resulting in heterogeneous distribution of the inorganic component. When a catalyst is added, it is preferred to carry out the hydrolysis at a temperature in the range of from 10° to 50° C. for the purpose of regulating the reaction rate.

The hydrolysis time is preferably not less than 5 hr in the case of a system consisting of water alone and not less then one hr in the case of a system containing a catalyst. In order to permit the hydrolysis to proceed homogeneously and rapidly, the hydrolysis is preferably carried out with stirring. Furthermore, it is also possible to improve the mechanical strength of the coating by keeping the reaction mixture as it is for 20 hr or longer after the reaction, thereby carrying out maturing to complete the reaction.

Most of the metallic compounds are usually insoluble or sparingly soluble in water. Therefore, in the case of a system consisting of water alone, a lot of time is required to initiate the hydrolysis and, at the same time, there is a possibility that the reaction occurs heterogeneously to enhance the content of the inorganic component in the system higher than required. For this reason, in the production of the coating composition of the present invention, the copresence of an alcohol or an ether as a hydrophilic organic solvent and water is still preferred for hydrolysis in a shorter time with a higher efficiency.

Also when the hydrolysis is carried out in a system where water and an organic solvent are present, the hydrolysis temperature is preferably in the range of from room temperature to 80° C., particularly preferably in the range of from 50° to 80° C. In order to provide a satisfactory hydrolyzate, the reaction time is 3 hr or longer and, in a system containing a catalyst, is 30 min or longer.

The metallic compound may be hydrolyzed after it is added to a synthetic resin emulsion solution. Alternatively, after the hydrolysis of the metallic compound is previously carried out completely or insufficiently, the resultant hydrolyzate or partial hydrolyzate may be added to the synthetic resin emulsion. However, in order to render the final coating more homogeneous, it is still preferred to use a method wherein at least part of the compound is previously hydrolyzed and the at least partly hydrolyzed compound is added to the synthetic resin emulsion.

The inorganic component produced in the hydrolysis or condensation of the metallic compound may be fixed within the synthetic resin particles before the coating composition is coated or simultaneously with the coating. The metallic compound is fixed to the synthetic resin particles through a hydrogen bond and/or a covalent bond.

Colorants, ultraviolet absorbers, thickeners, preservatives, and the like may be added to the coating composition of the present invention in such an amount as will not be detrimental to the optical properties of the coating composition.

Formation of Coating

The substrate contemplated to be used with the coating composition of the present invention is not particularly limited. The coating may be carried out by various coating methods, such as bar coating, roll coating, spray coating, dip coating, spin coating, curtain flow coating, and cast coating.

Further, drying at a temperature above the minimum film forming temperature after coating may be carried out by any of hot air drying, drying by heating, and other drying methods.

The coating is formed by fusing or binding between synthetic resin particles. However, fusing or binding becomes often unsatisfactory under some drying conditions or the like, resulting in the formation of voids between particles. When the voids are distributed over the whole coated surface, the appearance or the film strength is unfavorably remarkably deteriorated. In such a case, it is known that the addition of a film forming aid and the like facilitates fusing and binding between the particles. Also in the present invention, it is possible to use as the film forming aid ethylene glycol monobutyl ether, diethylene glycol monobutyl ether acetate, and 2,2,4-trimethyl-1,3-pentanediol monoisobutylate.

The thickness of the coating may be properly determined depending upon the applications of the coating and is not particularly limited. For example, when a protective film or a layer having a high refractive index in an antireflection film is formed by coating on the surface of the substrate, the coating formed should have a relatively large thickness in the range of from about 0.1 μm to 0.5 mm. On the other hand, when a layer having a low refractive index as the outermost layer in an antireflection film is formed, the coating formed preferably has a relatively small thickness, for example, in the range of from about 0.01 to 0.05 μm.

Method for Intentionally Producing Inorganic Component on and in the Vicinity of the Surface of Synthetic Resin Particles According to a process for producing the coating composition of the present invention, when an inorganic component has been introduced into the synthetic resin particles, the inorganic component is more or less distributed also on and in the vicinity of the surface of the synthetic resin particles. The inorganic component, however, can be intentionally produced on and in the vicinity of the surface of the synthetic resin particles by applying at least one metallic compound capable of forming a hydrogen bond in a hydrophobic solution to synthetic resin particles having a hydrogen bond forming group. In this case, polar solutions capable of sufficiently swelling the synthetic resin particles, for example, generally benzene and toluene, can be advantageously used because they have high effect in respect of homogeneity of the coating composition and the coating.

An inorganic component can be intentionally produced on and in the vicinity of the surface of the synthetic resin particles by a method different from the above method, i.e., by using synthetic resin particles having a hydrogen bond forming group distributed on and in the vicinity of the surface of the synthetic resin particles. A further method which can intentionally produce an inorganic component on and in the vicinity of the surface of the synthetic resin particles is to use synthetic resin particles having a high crosslinking density. Furthermore, the above methods for producing an inorganic component may be used in combination.

The coating composition of the present invention can be coated on the surface of the substrate and dried at room temperature or the minimum film forming temperature of the synthetic resin particles or above, preferably at a temperature of 200° C. or below to form a coating which is in the form of a transparent hard coating and, at the same time, optionally exhibits excellent optical properties, such as antireflection properties. The substrate which is used with the coating composition of the present invention is not particularly limited. Further, the resultant coating may be dried by any of air drying, hot air drying, drying by heating, and other drying methods.

In the coating composition of the present invention, it is also possible to add a film forming aid or the like for the purpose of preventing the occurrence of fine cracks on the surface of the coating due to a difference in evaporation rate of a solvent at the time of drying.

The thickness of the coating can be properly determined depending upon the applications of the coating and is not particularly limited. For example, when the use of the coating as a protective film on the surface of a substrate or for building materials is contemplated, the coating should have a relatively large thickness in the range of from about 0.1 μm to 0.5 mm. On the other hand, when a layer having a low refractive index as the outermost layer in an antireflection film is formed, the layer is preferably formed of a relatively thin film, such as an optical thin film, having a relatively small thickness, for example, in the range of from about 0.01 to 0.05 μm.

If necessary, colorants, ultraviolet absorbers, thickeners, preservatives, film forming aids, and the like may be added to the coating composition of the present invention in such an amount as will not be detrimental to the optical properties of the coating composition. It is noted that the coating composition of the present invention, even when it does not contain any film forming aid, can form a transparent uniform film.

As described above, in the coating composition of the present invention, a metallic compound capable of forming a hydrogen bond is introduced and adsorbed within synthetic resin particles swollen by an organic solvent or heating and on and in the vicinity of the surface of the synthetic resin particles, and the metallic compound is hydrolyzed and condensed while forming a hydrogen bond mainly with a hydrogen bond forming group of the resin or in some cases while forming an ester bond simultaneously with the growth of an inorganic component and the fixation of part of the grown inorganic component within the synthetic resin particles and, further, on and in the vicinity of the synthetic resin particles.

Figure 1:
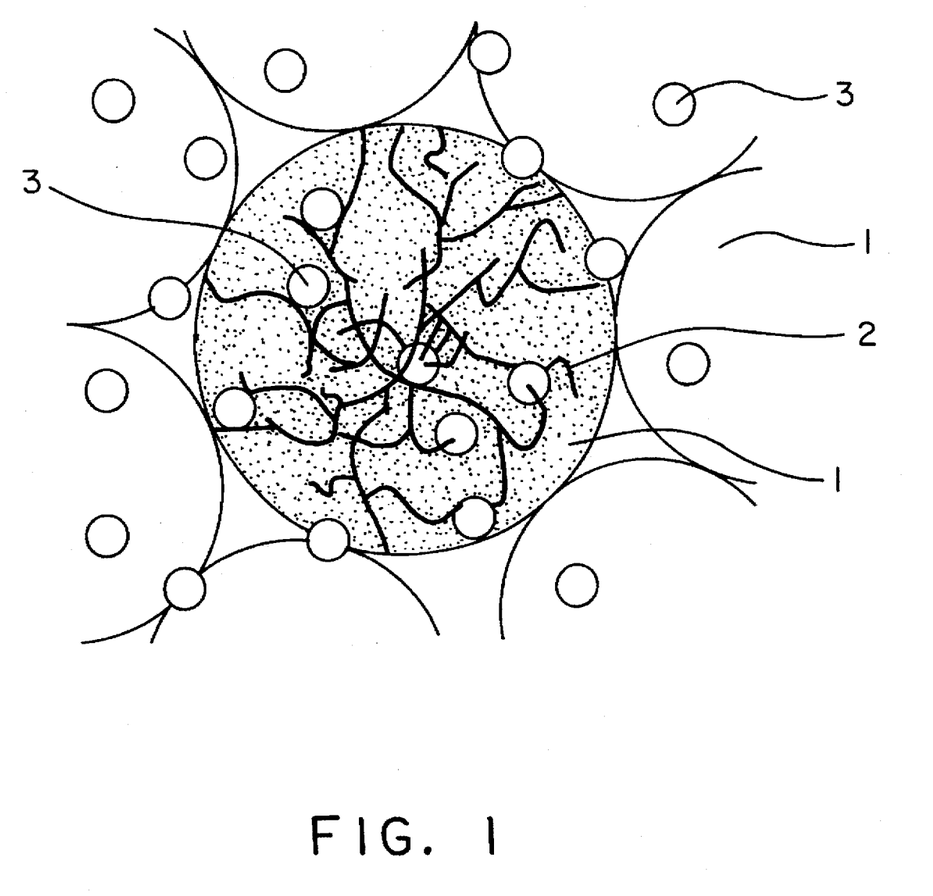
FIG. 1 is a schematic sectional view of a synthetic resin particle in the coating according to the present invention with an inorganic component present within the synthetic resin particle being grown.
Figure 2:
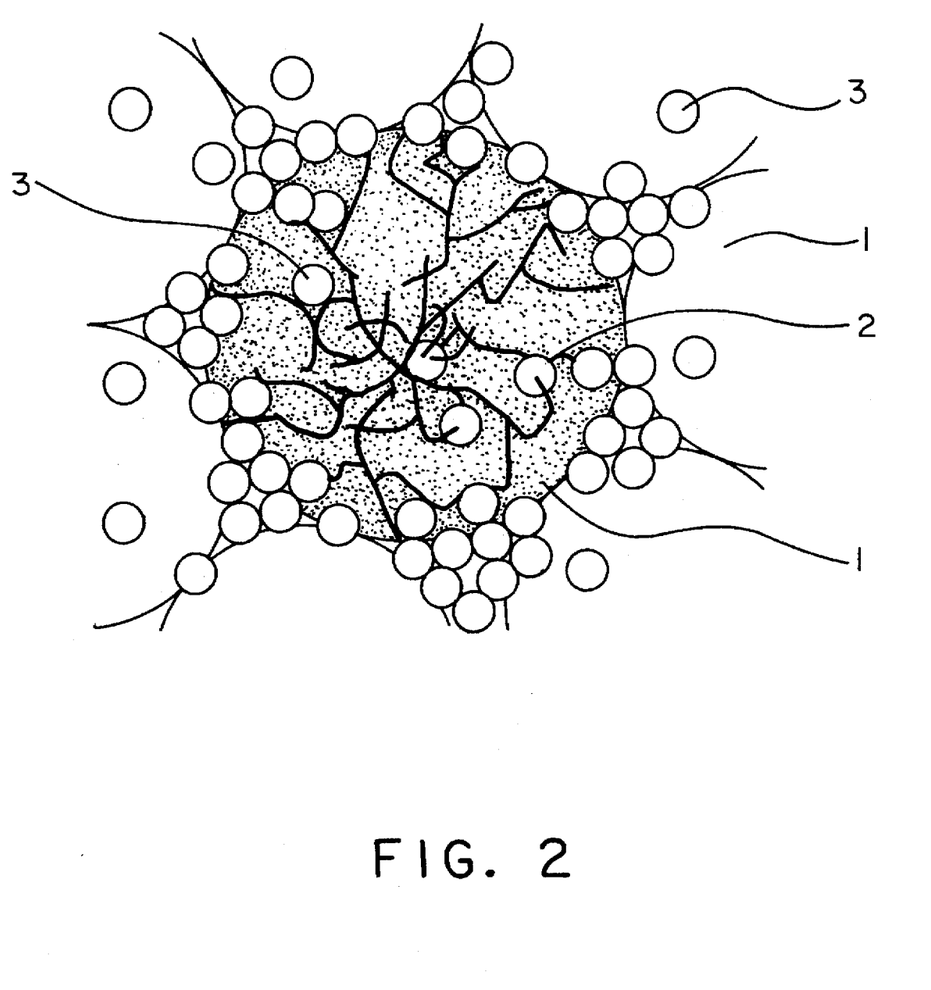
FIG. 2 is a schematic sectional view of a synthetic resin particle in the coating according to the present invention with an inorganic component present within and on the surface of the synthetic resin particle being grown.

The state of synthetic resin particles in a coating formed using the coating composition of the present invention can be explained by a schematic sectional view of a synthetic resin particle shown in FIG. 1 or 2.

In FIG. 1, numeral 1 designates a synthetic resin particle wherein a thick line 2 represents a particularly densely crosslinked portion. A white circle 3 represents a grown inorganic component. As shown in FIG. 1, each inorganic component 3 in a coating formed using the coating composition of the present invention is homogeneously distributed on and within the synthetic resin particles, and there is no possibility that, in the course of drying of the coating, the formation of the coating by fusing or binding between the synthetic resin particles 1 is inhibited by the inorganic component 3. Therefore, the synthetic resin particles 1 in the formed coating are mutually adhered, and the coating is homogeneous and has high mechanical strength.

FIG. 2 is a schematic sectional view of the same synthetic resin particle as shown in FIG. 1, except that the inorganic component is distributed within the synthetic resin particle and, at the same time, intentionally grown on and in the vicinity of the surface of the synthetic resin particle. The grown inorganic compound and the synthetic resin particle have good affinity for each other, and the inorganic compound gathers on and covers the surface of the synthetic resin particle. Therefore, the synthetic resin particles 1 in the formed coating are mutually adhered, and, at the same time, the inorganic component forms a continuous layer. Thus, a continuous layer is formed wherein the interface of the inorganic component and the organic component is continuously connected. The resultant coating is transparent and homogeneous and, further, since the inorganic component has lower surface tension than the organic component, part of the inorganic component is raised on the surface layer of the coating. Therefore, the coating is homogeneous and has high mechanical strength and high heat resistance. Further, it contains an organic polymer and, hence, has flexibility.

Figure 3:
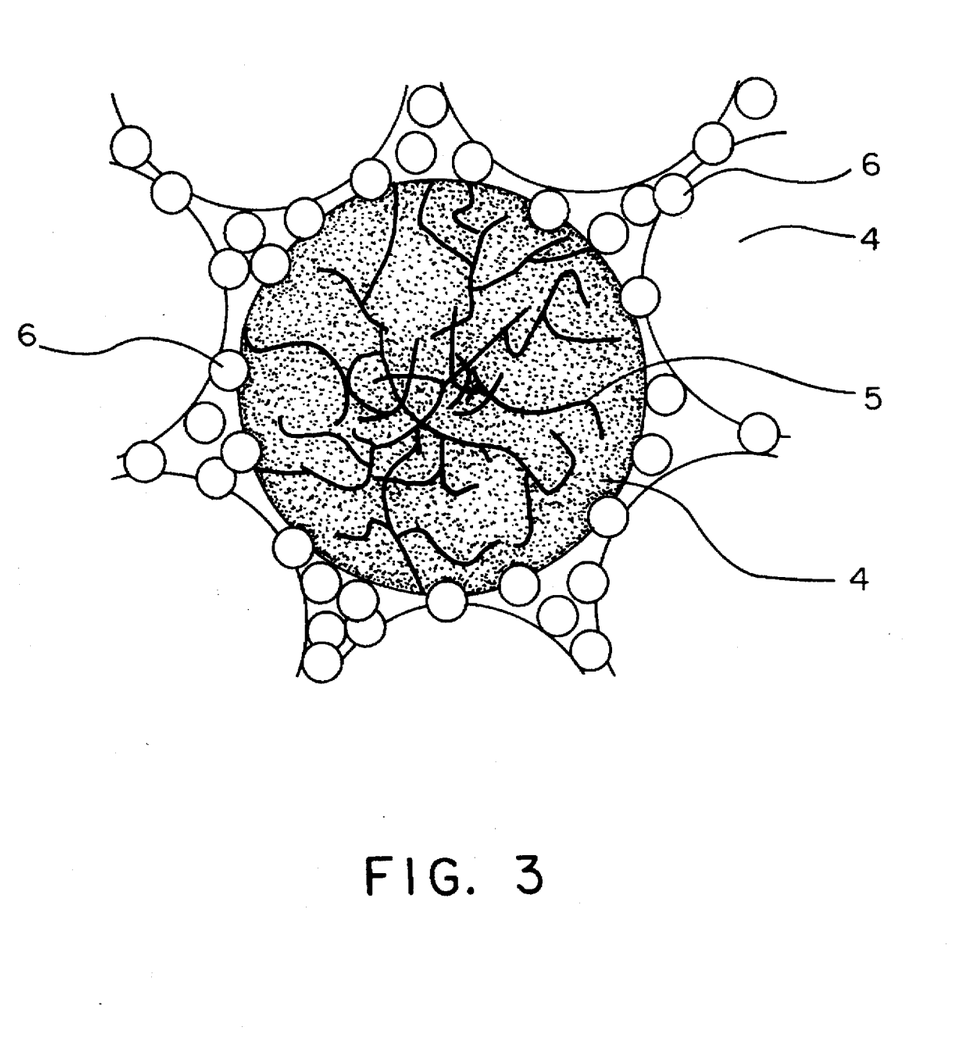
FIG. 3 is a schematic sectional view of a synthetic resin particle in a coating prepared using the synthetic resin particle described in the above column of "BACKGROUND OF THE INVENTION"

For comparison with the above coating formed using the coating composition of the present invention, a schematic sectional view of a synthetic resin particle in a coating formed of an inorganic ultrafine particle having on its surface a hydroxyl group and a synthetic resin particle having a hydrogen bond forming group, as described in the above column of "BACKGROUND OF THE INVENTION," is shown as a reference in FIG. 3. As shown in FIG. 3, the inorganic ultrafine particles 6 are not penetrated into the synthetic resin particle 4 and gathers only at the interface. For this reason, the synthetic resin particles 4 are mutually bonded to one another through the inorganic ultrafine particle 6, so that the bonding strength between the synthetic resin particles 4 in the prior art is lower than that in the coating composition of the present invention and, consequently, the resultant coating has lower mechanical strength than that of the present invention.

As described above, a coating formed using the coating composition of the present invention has much higher strength than that formed from the conventional synthetic resin particles and, at the same time, improved heat resistance and flame resistance which can prevent carbonization of an organic component even when the coating is baked at a high temperature. Further, since the coating according to the present invention may contain a large amount of an inorganic component, the refractive index of the coating can be regulated as desired by selecting an inorganic component from inorganic materials having various refractive indexes and, in particular, properties characteristic of an optical functional film, such as antireflection effect, can be imparted to the coating.

Furthermore, in the coating according to the present invention, when silicon oxide having excellent oxygen permeability is selected as the inorganic component, the inorganic component forms a continuous layer, so that the coating does not inhibit respiration of building materials, such as woods, which property is required of a paint for building.

The conventional coating prepared from an inorganic polymer or a blend of an inorganic polymer with an organic polymer causes cracking to significantly lower the strength when the thickness is several μm. By contrast, the coating of the present invention has high strength enough not to cause such cracking even when the thickness is as large as several tens of μm. The reason for this is believed as follows. In the formation of a coating, the synthetic resin particles are partly fused or bound to one another. When the amount of the inorganic component added is large as a whole, they serve as the so-called "filler."

When the interior of the synthetic resin particles is crosslinked to a suitable extent, the inorganic component introduced into the interior of the synthetic resin particles is considered to enhance the crosslinking density of the synthetic resin particles and the inorganic component introduced into the synthetic resin particle on its surface portion serves to improve the affinity at the interface and, at the same time, to hold the shape of the synthetic resin particle, enabling the synthetic resin particles to serve as the filler more effectively.

EXAMPLES

Example 1

A monomer mixture of 7 parts by weight of butyl acrylate with 3 parts by weight of methyl methacrylate was added dropwise to a solution of 0.2 part by weight of sodium alkylphenylethersulfonate dissolved in 10 parts by weight of water to carry out emulsion polymerization. In the course of the emulsion polymerization, when the remainder of the monomer mixture has become ⅗ of the initial amount of the monomer mixture, 0.5 part by weight of 2-hydroxyethyl methacrylate, together with the monomer mixture, was added dropwise to carry out emulsion polymerization, thereby preparing a coating forming synthetic resin emulsion (solid content: 30% by weight) comprising synthetic resin particles having a hydroxyl group (particle diameter: 0.6 μm) and water.

2 parts by weight of the coating forming synthetic resin emulsion was added dropwise to a mixed solution comprising 14 parts by weight of tetrahydrofuran and 4 parts by weight of ethanol to prepare a homogeneous solution containing sufficiently swollen synthetic resin particles.

To the coating forming synthetic resin emulsion solution thus obtained was added 15.7 parts by weight of an organometallic compound mixed solution having the following composition, and the mixture was stirred at 70° C. for 5 hr to carry out a hydrolysis reaction, thereby preparing a coating composition of Example 1.

Composition of Organometallic Compound Mixed Solution

| Composition of organometallic compound mixed solution | |
|---|---|
| Tetraethoxysilane | 10% by weight |
| Ethanol | 4% by weight |
| Water | 1.2% by weight |
| 0.1 N hydrochloric acid | 0.5% by weight |

10 parts by weight of diethylene glycol monobutyl ether acetate was added as a film forming aid to the coating composition, and the mixture was coated on a polyethylene terephthalate (PET) film as a substrate film by means of a wire bar at a coverage of 0.03 g/m$^2$ on a dry basis, and the resultant coating was dried at 80° C. for one hr, thereby forming a coating of Example 1.

Figure 4:
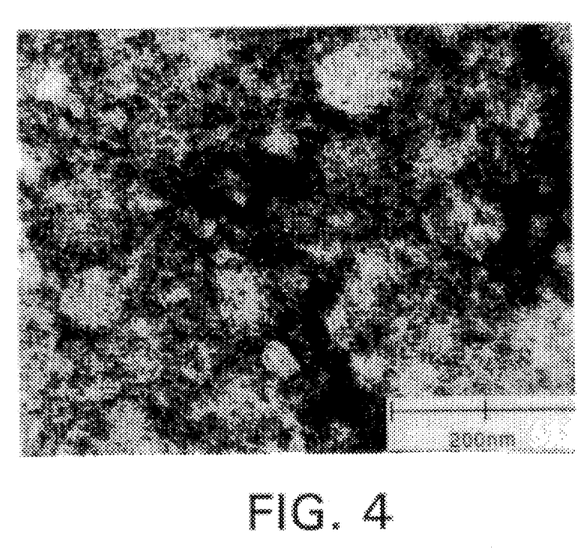
FIG. 4 is a transmission electron photomicrograph of the coating prepared in Example 1, showing the structure of a synthetic resin particle.

FIG. 4 is a transmission electron photomicrograph of the coating thus formed. According to FIG. 4, in the coating of Example 1, an inorganic component is present within synthetic resin particles. In order to confirm properties of the coating as a reflection preventive film, the visible light transmission around 550 nm was measured, and the results are given in the following Table 1.

The strength of the coating was measured by a pencil hardness test and found to be B–HB. Since the pencil hardness of a coating consisting of synthetic resin particles only is about 4B, the coating of Example 1 had considerably increased strength. Further, heating of the coating of Example 1 at 140° C. for one hr resulted in an increase in pencil hardness to 2H–3H.

Comparative Example 1

Thermogravimetric analysis has revealed that, according to the method described in Example 1, 3 parts by weight of SiO$_2$ particles are produced from 10 parts by weight of tetraethoxysilane. Based on this finding, 10 parts by weight of a colloidal silica solution of ethanol dispersion type (solid content: 30% by weight) and 3 parts by weight of ethanol for regulating the final solid content were added to 20 parts by weight of the coating forming synthetic resin emulsion solution prepared according to the method described in Example 1, thereby preparing a coating composition.

Thereafter, 10 parts by weight of diethylene glycol monobutyl ether acetate was added as a film forming aid to the coating composition, and the resultant mixture was coated directly on the same PET film as used in Example 1 by means of a wire bar at a coverage of 0.03 g/m$^2$ on a dry basis, and the resultant coating was dried at 80° C. for one hr, thereby forming a coating of Comparative Example 1.

Figure 5:
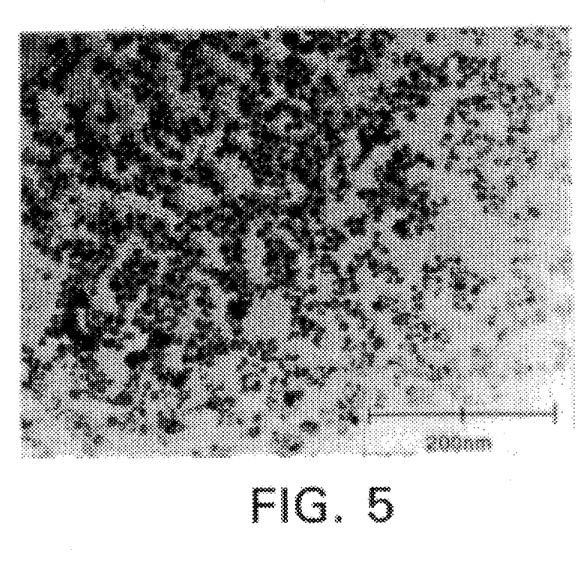
FIG. 5 is a transmission electron photomicrograph of the coating prepared in Comparative Example 1, showing the structure of a synthetic resin particle.

FIG. 5 is a transmission electron photomicrograph of the coating thus formed. According to FIG. 5, in the coating of Comparative Example 1, an inorganic component is present at the interface of the synthetic resin particles. In order to confirm properties of the coating as a reflection preventive film, the visible light transmission around 550 nm was measured, and the results are given in the following Table 1.

Mere rubbing of the coating with a finger caused peeling of the coating, rendering the pencil hardness immeasurable.

Comparative Example 2

The coating forming synthetic resin emulsion solution prepared in Example 1 was coated, without addition of any organometallic compound mixed solution, directly on the same PET film as used in Example 1 by means of a wire bar at a coverage of 0.02 g/m$^2$ on a dry basis, and the resultant coating was dried at 80° C. for one hr, thereby forming a coating of Comparative Example 2.

Example 2

A coating composition of Example 2 was prepared in the same manner as in Example 1, except that a methylol-containing reactive polymer microgel emulsion (solid content: 30% by weight) (LA-541M2 (trade name) manufactured by Hoechst Gosei K. K.), which is a coating-forming synthetic resin emulsion containing synthetic resin particles (particle diameter: 30 nm) having an internally crosslinked structure, was used as the coating forming synthetic resin emulsion.

Then, a coating of Example 2 was formed in the same manner as in Example 1, except that the above coating composition was used.

A transmission electron photomicrograph of the coating thus formed revealed that the coating had substantially the same structure as that shown in FIG. 4. Further, the coating had a visible light transmission at 550 nm of 93%.

Comparative Example 3

A coating of Comparative Example 3 was formed in the same manner as in Example 1, except that, in the production of synthetic resin particles in Example 1, emulsion polymerization was carried out without use of 2-hydroxyethyl methacrylate to prepare a coating forming synthetic resin emulsion (solid content: 30% by weight) comprising synthetic resin particles not having a hydrogen bond forming group and water. As a result, at the time of coating and drying, clouding was observed in the whole coating, and mere rubbing of the resultant coating with a finger caused peeling of the coating.

Example 3

50 parts by weight of the coating-forming synthetic resin emulsion prepared in Example 1 was added dropwise to 135 parts by weight of isopropyl alcohol to prepare a homogeneous solution containing swollen synthetic resin particles.

Then, an organometallic compound solution having the following composition was stirred at 80° C. for 24 hr to carry out a hydrolysis reaction, and 90 parts by weight of the reaction mixture was added to 185 parts by weight of the above solution with synthetic resin particles being homogeneously dispersed therein, and the mixture was stirred at 80° C. for 24 hr, thereby preparing a coating composition of Example 3.

Composition of Organometallic Compound Mixed Solution

| Composition of organometallic compound mixed solution | |
|---|---|
| Aluminum isopropoxide | 1% by weight |
| Water | 15% by weight |

Thereafter, the coating solution of Example 3 was coated on a polyethylene terephthalate film (PET) by means of a wire bar at a coverage of 0.05 g/m² on a dry basis, and the resultant coating was dried at 80° C. for 2 hr, thereby forming a coating of Example 3.

In order to confirm properties of the coating as a reflection preventive film, the visible light transmission around 550 nm and the hardness by the pencil scratch test were measured, and the results are given in the following Table 1.

Example 4

2 parts by weight of the coating-forming synthetic resin emulsion (solid content: 30% by weight) prepared in Example 1, 0.5 part by weight of 0.1N hydrochloric acid, and 1.2 parts by weight of water were added dropwise to 20 parts by weight of toluene, and the mixture was vigorously stirred to disperse fine droplets of an emulsion containing hydrochloric acid in toluene. Then, 10 parts by weight of tetraethoxysilane was added to the coating-forming emulsion solution, and hydrolysis was allowed to proceed at 70° C. for 5 hr with vigorous stirring. In this case, the hydrolysis reaction of tetraethoxysilane dissolved in toluene occurs at the interface of the emulsion and the toluene solution rather than within the synthetic resin particles. Therefore, $SiO_2$ is selectively grown mainly on and in the vicinity of the surface of the emulsion particles.

In an early stage, this reaction is considerably heterogeneous. However, as the reaction proceeds, ethanol is formed as a by-product, rendering the reaction homogeneous. In this case, an $SiO_2$ film is formed first on or in the vicinity of the surface of the emulsion, so that little or no subsequent adsorption of tetraethoxysilane within the emulsion occurs.

A coating was formed in the same manner as in Example 1, except that the above coating composition of Example 4 was used. The resultant coating had a visible light transmission of 87% and a pencil hardness of HB and remained transparent after baking at 300° C.

TABLE 1

|  | Visible light transmission (%) | Pencil hardness |
|---|---|---|
| PET film | 88% | 2B |
| Ex. 1 | 92% | H |
| Ex. 3 | 88% | H |
| Ex. 4 | 87% | HB |
| Comp. Ex. 1 | 90% | 3B |
| Comp. Ex. 2 | 88% | 5B |

From Table 1, it is apparent that, as compared with the PET film (substrate film) as a control and the coating of Comparative Example 2, each of the coatings of Example 1 and Comparative Example 1 had increased visible light transmission, that is, antireflection effect. Further, it is apparent that the coating of Example 1 had higher visible light transmission and better antireflection effect than that of Comparative Example 1.

Further, it is apparent that, for Comparative Example 1, the silica sol is present in a large proportion in an aggregated state at the interface of synthetic resin particles but absent within the synthetic resin particles, causing fusing between synthetic resin particles to be partially inhibited. This renders the coating partially opaque and, hence, results in inferior transmission when the theoretical amount of the inorganic component is identical.

Furthermore, part of the coating prepared in Comparative Example 1 was easily peeled off upon rubbing with a finger. By contrast, the coatings prepared in Examples 1 and 2 brought about no such peeling, indicating that they had improved coating strength over the PET film.

The individual coating compositions were dip-coated on a glass substrate to a thickness of 30 μm, and the resultant coatings were baked in air at 300° C. As a result, the coatings of Examples 1 to 4 were completely transparent and adhered to the glass substrate, whereas for the coatings of Comparative Examples 1 and 2, the synthetic resin particles were carbonized to cause a significant change of color and, at the same time, these coatings were easily peeled off.

Example 5

2 parts by weight of the coating forming synthetic resin emulsion (solid content: 30% by weight) prepared in Example 1 was added dropwise to a mixed solution of 2.5 parts by weight of toluene and 8 parts by weight of ethanol, and the mixture was heated at 50° C. to prepare a homogeneous solution containing sufficiently swollen synthetic resin particles.

To the swollen synthetic resin emulsion solution thus prepared was added 9 parts by weight of an organometallic compound mixed solution having the following composition, and the mixture was stirred at 70° C. for 5 hr to carry out a hydrolysis reaction, thereby preparing a coating composition of Example 5.

Composition of Organometallic Compound Mixed Solution

| Composition of organometallic compound mixed solution | |
| --- | --- |
| Tetraethoxysilane | 6 parts by weight |
| Ethanol | 2 parts by weight |
| 0.1 N hydrochloric acid | 1 parts by weight |

Figure 6:
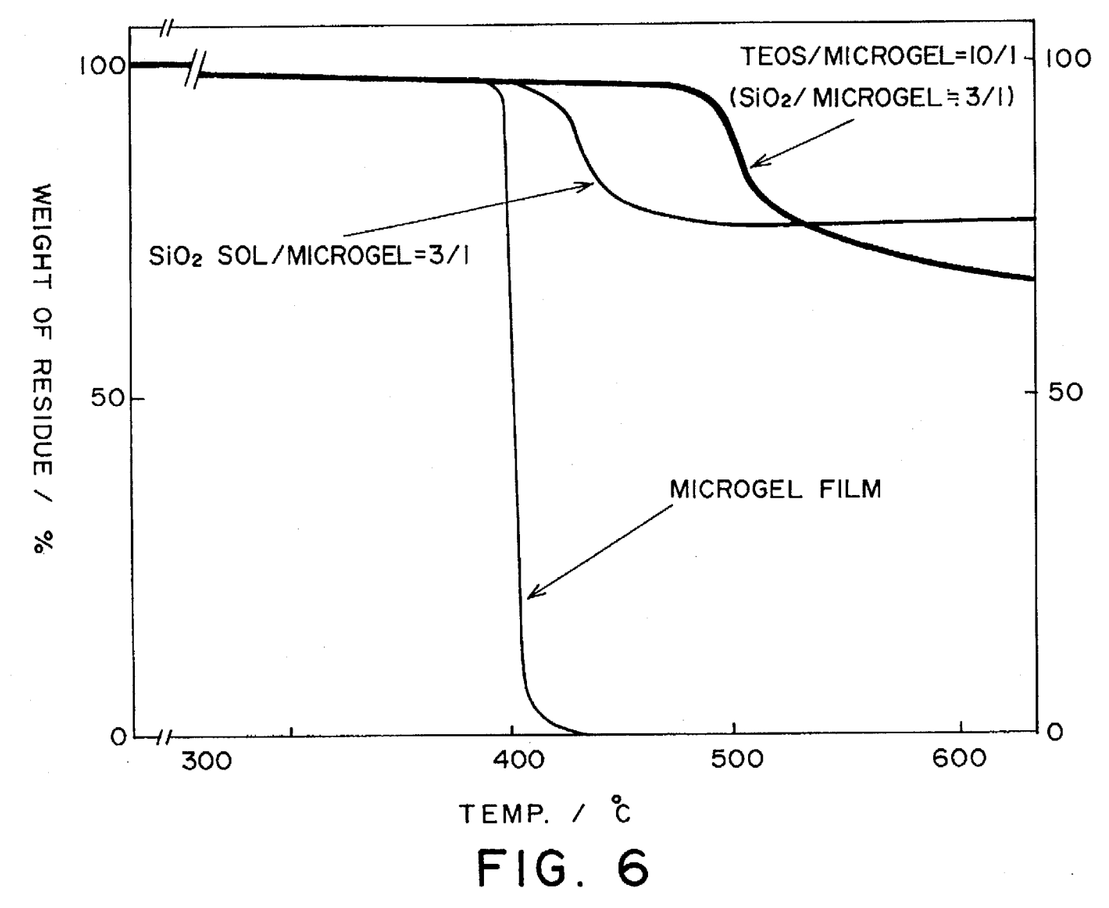
FIG. 6 is a graph showing heat resistance in terms of the relationship between the temperature (°C.) plotted as abscissa and the weight of residue (%) plotted as ordinate, for coatings prepared in Example 5, Comparative Example 4, and Comparative Example 5.

The above coating composition was cast onto a glass substrate and dried at 80° C. for one hr, thereby forming a composite film of Example 5 with an inorganic component and an organic component being bonded to each other through a hydrogen bond and/or a covalent bond. The composite film was heated at varied temperatures to determine the weight (%) of the residue (by presuming the weight of the composite film before heating to be 100%). The results are shown in FIG. 6. Further, the coating was allowed to stand at 300° C. for 30 min. As a result, the appearance of the coating remained completely transparent, no change was observed, and the reduction in transmission in visible light region after heating, as compared with the transmission before heating, was 0%.

Comparative Example 4

Thermogravimetric analysis has revealed that, according to the method described in Example 5, 1.7 parts by weight of $SiO_2$ particles are produced from 6 parts by weight of tetraethoxysilane. Based on this fact, 5.6 parts by weight of a colloidal silica solution of ethanol dispersion type (solid content: 30% by weight) was added to 12.5 parts by weight of the coating forming synthetic resin emulsion solution prepared according to the method described in Example 5, thereby preparing a coating composition of Comparative Example 4.

Thereafter, the coating composition was cast onto a glass substrate, and the resultant coating was dried at 80° C. for one hr, thereby forming a coating of Comparative Example 4. This coating was heated under the same conditions as in Example 5 to determine the weight (%) of the residue. The results are shown in FIG. 6. The reduction in transmission in a visible light region as measured under the same heating conditions as in Example 5 was 85% (percentage reduction).

Comparative Example 5

The coating forming synthetic resin emulsion solution prepared in Example 5 was cast, without addition of any organometallic compound solution, directly onto the same glass substrate as used in Example 5, and the resultant coating was dried at 80° C. for one hr, thereby forming a coating of Comparative Example 5. This coating was heated under the same conditions as in Example 5 to determine the weight (%) of the residue. The results are shown in FIG. 6. The reduction in transmission in a visible light region as measured under the same heating conditions as in Example 5 was 70% (percentage reduction).

For a coating formed using the coating composition of the present invention, a metallic compound, in the coating composition, is introduced into or on the surface of synthetic resin particles with the formation of a hydrogen bond with a hydrogen bond forming group of the synthetic resin particles, in some cases, with the formation of an ester bond, and then hydrolyzed or condensed to produce an inorganic component at least part of which is bonded through a hydrogen bond and/or an ester bond to a resin within the synthetic resin particles and on and in the vicinity of the surface of the synthetic resin particles, resulting in strong fixation of the inorganic component. Further, in this case, the inorganic component is homogeneously distributed within the synthetic resin particles and on the surface of the synthetic resin particles, and the synthetic resin particles are cured with the synthetic resin particles being mutually contacted and fused. Alternatively, the synthetic resin particles are covered with the inorganic component to form a continuous layer of the inorganic component in the coating. Therefore, the resultant coating has high mechanical strength in respect of elasticity, toughness, and the like in combination with flexibility, adhesion, and other properties. In particular, a coating wherein a part of the inorganic component is raised on the outermost layer of the coating and, in this state, fixed has improved surface hardness and excellent heat resistance and flame retardancy.

The use of a particular inorganic component provides a coating which has excellent optical properties and, hence, is suitable as an antireflection film or the like.

I claim:

1. A process for producing a coating composition, comprising the steps of: swelling particles of a synthetic resin having a hydrogen bond forming group selected from the group consisting of a homopolymer of an $\alpha,\beta$-ethylenically unsaturated monomer and a copolymer of an $\alpha,\beta$-ethylenically unsaturated monomer; introducing at least one metallic compound capable of forming a hydrogen bond into said synthetic resin particles, said metallic compound being selected from the group consisting of organometallic compounds consisting of a metal alkoxide, metal acetylacetonate and a metal carboxylate; a hydrolysate, a partial hydrolysate and a partial condensate of the organometallic compounds; inorganic metal compounds consisting of a metal nitrate, a metal oxynitrate and a metal chloride; and a hydrolysate, a partial hydrolysate and a partial condensate of the inorganic metal compounds; and hydrolyzing and condensing said metallic compound within said synthetic resin particles to generate and grow an inorganic component, at least part of the grown inorganic component being reacted with said hydrogen bond forming group present within said synthetic resin particles, thereby fixing the grown inorganic component in said synthetic resin particles.

2. The process of claim 1, wherein said synthetic resin particles are swollen by adding the particles to an organic solvent and/or heating the particles.

3. The process of claim 2, wherein the grown inorganic component is fixed in said synthetic resin particles through a hydrogen bond and/or a covalent bond.

4. The process of claim 2, wherein the fixation of the grown inorganic component on and in said synthetic resin particles is intentionally carried out by applying in a hydrophobic solution at least one metallic compound capable of forming a hydrogen bond to said particles of a synthetic resin having a hydrogen bond forming group.

5. The process of claim 2, wherein the fixation of the grown inorganic component on and in said synthetic resin particles is intentionally carried out by using particles of a synthetic resin having a hydrogen bond forming group distributed on and in the vicinity of the surface thereof.

6. The process of claim 1, wherein said hydrolysis of said metallic compound is carried out by using water in an amount of about 1 to about 10 mol per mol of said metallic compound.

7. The process of claim 6, wherein the grown inorganic component is fixed in said synthetic resin particles through a hydrogen bond and/or a covalent bond.

8. The process of claim 7, wherein said synthetic resin particles are in the form of an ultrafine particle polymer latex having a particle diameter of not more than 10 μm.

9. The process of claim 1, wherein said hydrolysis of said metallic compound is carried out at room temperature to 80° C.

10. The process of claim 9, wherein the grown inorganic component is fixed in said synthetic resin particles through a hydrogen bond and/or a covalent bond.

11. The process of claim 10, wherein said synthetic resin particles are in the form of an ultrafine particle polymer latex having a particle diameter of not more than 10 μm.

12. The process of claim 1, wherein the grown inorganic component is fixed into said synthetic resin particles through a hydrogen bond and/or a covalent bond.

13. The process of claim 1, wherein said synthetic resin particles are in the form of an ultrafine particle polymer latex having a particle diameter of not more than 10 μm.

14. A process for producing a coating composition, comprising the steps of: swelling particles of a synthetic resin having a hydrogen bond forming group selected from the group consisting of a homopolymer of an $\alpha,\beta$-ethylenically unsaturated monomer and a copolymer of an $\alpha,\beta$-ethylenically unsaturated monomer; introducing at least one metallic compound capable of forming a hydrogen bond into said synthetic resin particles and permitting said metallic compound to gather on and in the vicinity of the surface of said synthetic resin particles, said metallic compound being selected from the group consisting of organometallic compounds consisting of a metal alkoxide, metal acetylacetonate and a metal carboxylate; a hydrolysate, a partial hydrolysate and a partial condensate of the organometallic compounds; inorganic metal compounds consisting of a metal nitrate, a metal oxynitrate and a metal chloride; and a hydrolysate, a partial hydrolysate and a partial condensate of the inorganic metal compounds; and hydrolyzing and condensing said metallic compound within said synthetic resin particles and on and in the vicinity of the surface of said synthetic resin particles to generate and grow an inorganic component, at least part of the grown inorganic component being reacted with said hydrogen bond forming group present within said synthetic resin particles and on and in the vicinity of the surface of said synthetic resin particles, thereby fixing the grown inorganic component within said synthetic resin particles and on and in the vicinity of the surface of said synthetic resin particles.

15. The process of claim 14, wherein said synthetic resin particles are swollen by adding the particles to an organic solvent and/or heating the particles.

16. The process of claim 15, wherein the fixation of the grown inorganic component on and in the vicinity of the surface of said synthetic resin particles is intentionally carried out by applying in a hydrophobic solution at least one metallic compound capable of forming a hydrogen bond to said particles of a synthetic resin having a hydrogen bond forming group.

17. The process of claim 15, wherein the fixation of the grown inorganic component on and in the vicinity of said synthetic resin particles is intentionally carried out by using particles of a synthetic resin having a hydrogen bond forming group distributed on and in the vicinity of the surface thereof.

18. The process of claim 15, wherein the grown inorganic component is fixed into said synthetic resin particles and on and in the vicinity of the surface of said synthetic resin particles through a hydrogen bond and/or a covalent bond.

19. The process of claim 14, wherein the fixation of the grown inorganic component on and in the vicinity of the surface of said synthetic resin particles is intentionally carried out by applying in a hydrophobic solution at least one metallic compound capable of forming a hydrogen bond to said particles of a synthetic resin having a hydrogen bond forming group.

20. The process of claim 14, wherein the fixation of said grown inorganic component on and in the vicinity of said synthetic resin particles is intentionally carried out by using particles of a synthetic resin having a hydrogen bond forming group distributed on and in the vicinity of the surface thereof.

21. The process of claim 14, wherein said hydrolysis of said metallic compound is carried out by using water in an amount of about 1 to about 10 mol of said metallic compound.

22. The process of claim 21, wherein the grown inorganic component is fixed into said synthetic resin particles and on and in the vicinity of the surface of said synthetic resin particles through a hydrogen bond and/or a covalent bond.

23. The process of claim 22, wherein said synthetic resin particles are in the form of an ultrafine particle polymer latex having a particle diameter of not more than 10 μm.

24. The process of claim 14, wherein said hydrolysis of said metallic compound is carried out at room temperature to 80° C.

25. The process of claim 24, wherein the grown inorganic component is fixed into said synthetic resin particles and on and in the vicinity of the surface of said synthetic resin particles through a hydrogen bond and/or a covalent bond.

26. The process of claim 25, wherein said synthetic resin particles are in the form of an ultrafine particle polymer latex having a particle diameter of not more than 10 μm.

27. The process of claim 14, wherein the grown inorganic component is fixed into said synthetic resin particles and on and in the vicinity of the surface of said synthetic resin particles through a hydrogen bond and/or a covalent bond.

28. The process of claim 14, wherein said synthetic resin particles are in the form of an ultrafine particle polymer latex having a particle diameter of not more than 10 μm.

* * * * *